Nov. 25, 1969    E. H. LAND    3,479,936
EXPOSURE CONTROL SYSTEM.
Filed Dec. 23, 1966    4 Sheets-Sheet 1

INVENTOR.
Edwin H. Land
BY
Brown and Mikulka
and
Robert E. Corb
ATTORNEYS

FIG. 3

Nov. 25, 1969  E. H. LAND  3,479,936

EXPOSURE CONTROL SYSTEM

Filed Dec. 23, 1966  4 Sheets-Sheet 3

INVENTOR.
Edwin H. Land

BY Brown and Mikulka
and
Robert E. Corb
ATTORNEYS

3,479,936
EXPOSURE CONTROL SYSTEM
Edwin H. Land, Cambridge, Mass., assignor to Polaroid Corporation, Cambridge, Mass., a corporation of Delaware
Filed Dec. 23, 1966, Ser. No. 604,318
Int. Cl. G03b *41/02, 7/02;* G01j *1/44*
U.S. Cl. 95—10                                18 Claims

ABSTRACT OF THE DISCLOSURE

A camera in which a photosensitive image recording medium is moved relative to and past an elongated aperture which is substantially fixed with respect to an optical system which forms an image at a surface. A portion of the film is located at this surface during exposure to light transmitted through the aperture. The camera has a device for moving the image relative to the aperture so as to retain the image and the recording medium stationary with respect to one another during exposure of the recording medium by light transmitted through the aperture. There is also provided, a device for measuring the light from the incremental portion of the scene and varying a parameter of the aperture so as to vary the light energy admitted by the aperture in inverse relation to the brightness of that portion of the scene being photographed.

---

This invention relates to photographic apparatus in which a light-sensitive, image-recording medium is exposed during relative motion of the recording medium and a narrow aperture, and particularly to cameras of the type in which the duration of exposure is a function of aperture width and speed of movement of the image-recording medium relative to the aperture.

A camera of the panoramic type incorporating the present invention is shown and described in the copending U.S. patent application of Edwin H. Land, Ser. No. 549,961, filed May 13, 1966, now Patent No. 3,405,619, and generally comprises an optical system for forming an image at an image surface, means providing an aperture near the image surface, means for moving the image in the image surface relative to the aperture and means for moving a photosensitive image-recording medium behind the aperture to maintain the image and recording medium stationary with respect to one another and effect the exposure of the recording medium to produce an image therein. Exposure of the image-recording medium occurs during movement thereof past the aperture which, in cooperation with the means for moving the recording medium, functions in the nature of a shutter to initiate and terminate exposures as well as to control the amount of light energy reaching the recording medium. The effect of changing the shutter speed to product longer or shorter exposures may be achieved by varying a parameter such as width or light transmittance of the slit-type aperture hereinafter referred to as "shutter" aperture to distinguish from an aperture associated with the lens and functioning as a stop.

In conventional photographic practice, particularly under conditions involving the use of available or ambient light, the range of brightness values of the subject (often referred to a "brightness scale") will frequently exceed to a substantial extent of the useful exposure scale or range of the photosensitive image-recording material. In such instance, the exposure is made at an aperture stop and exposure duration (i.e., shutter speed) calculated to produce a proper exposure for only a portion of the subject with the result that the remainder of the subject is either over- or under-exposed. Exposures are usually made either by measuring the brightness value of a portion of the subject and making an exposure appropriate for that portion or by measuring the overall scene brightness by integrating means indicating an average brightness value and exposing for this average value. Both of these methods will frequently produce unsatisfactory results in available light photography when it is desired to reproduce a subject having a brightness scale exceeding the useful exposure scale of the recording medium.

During exposure of a recording medium in a camera of the type described in the aforementioned application in which the recording medium is moved relative to and past a narrow "shutter" aperture to effect exposure, at any instant the recording medium is being exposed to light from only a relatively small portion of the subject. This makes it possible to achieve one of the objects of the invention, namely, compressing the brightness scale of the subject by minimizing fluctuations in the light energy transmitted by the shutter aperture during an exposure.

Other objects of the invention are: to provide a scanning camera system including means for sensing the light energy incident on the shutter aperture and automatically varying a parameter of the shutter aperture during an exposure to minimize fluctuations in light energy transmitted by the shutter aperture; and to provide an exposure system as described in which the parameters of the exposure aperture that are varied include the width of the aperture and the light transmittance thereof.

The shutter aperture of the apparatus of the invention is in the general form of a narrow, elongated slit at least equal in length to one dimension (width or length) of the image at the plane or image surface in which the aperture is located. It will be apparent that the brightness scale of the subject may vary substantially from end to end of the shutter aperture so that changing the parameter of the entire shutter aperture uniformly throughout its length will result, in effect, in compression of the subject brightness scale in only one direction, that is, parallel with the direction of movement of the recording medium.

Accordingly, further objects of the invention are: to provide an exposure system including means for automatically measuring the intensity of light incidence upon each of a plurality of zones of the shutter aperture and accordingly changing a parameter of each zone of the aperture to reduce fluctuations in the light energy transmitted thereby; and to provide aperture control means as described providing for gradual transitions between the variable parameters of adjacent zones of the aperture so that variations in aperture light transmittance are gradual from zone to zone of the aperture and are not apparent in the visible image.

Still another object of the invention is to provide in an exposure system of the type described, photoresponsive means associated with the shutter aperture for automatically and continuously varying the width or light transmittance of the shutter aperture over the entire aperture or a plurality of zones thereof and having an extremely short reaction time between sensing of incident light variations and appropriate changes in aperture width or light transmittance.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The present invention is illustrated as embodied in a camera of the panoramic or scanning type, preferably designed to take a conventional photograph and including a lens having the normal field angle found in the conventional camera, while providing a number of substantial advantages over conventional nonfolding or box-type cameras. As pointed out in the aforementioned application, the camera is very small and compact in relation to the picture size, has no shutter per se, with both the shutter and processing functions of a self-developing camera being combined to further reduce the number and complexity of components, and is capable of utilizing a relatively simple and inexpensive film structure. In this camera, exposure of a photosensitive medium, e.g., a sheet, to produce an image of a scene therein is effected by moving the sheet in an exposure plane past a relatively narrow aperture, termed the "shutter" aperture, extending transversely of the direction of movement of the sheet and from side to side of the area of the sheet to be exposed. An image of the scene is formed at the exposure plane and is moved in the same direction and at the same speed as the photosensitive sheet so as to scan a relatively narrow incremental area of the scene extending from one side of the scene to the other. Since exposure occurs only during movement of the photosensitive sheet in the exposure plane past the aperture, a shutter is not required because exposure is initiated when the leading end of the photosensitive sheet is moved into alignment with the aperture and is terminated by movement of the trailing end of the photosensitive sheet from alignment with the aperture. The duration of exposure of any incremental area of the film is the function of the aperture width and the speed of movement of the film past the aperture and is substantially less than the total time required to make an exposure which is a function of the length of the photosensitive sheet and the speed of its movement.

In a conventional camera, the light energy reaching the film is a function of the size of the stop or aperture associated with the lens and the shutter speed or duration of exposure. In the camera of the invention, the light energy reaching the film is also a function of the lens stop and the shutter speed or duration of exposure, but differs in the latter respect in that the duration of exposure is a function of the light transmittance of an aperture and the speed of movement of the film relative to and past the aperture. The light transmittance of the shutter aperture is a characteristic of the aperture and may be changed by changing a parameter of the aperture including, but not limited to, the width of the aperture and the transmission or absorption properties of a window in the aperture. This feature of the camera makes possible the novel concept in photography of, in effect, compressing the brightness scale of the subject being photographed by minimizing fluctuation in the light energy (transmitted by the shutter aperture) incident on incremental areas of the recording medium during exposure of the recording medium thereby making possible the recording of more information about subjects having a brightness scale exceeding the useful exposure scale of the recording medium.

Reference is now made to FIGS. 1 through 4 of the drawings wherein there is illustrated photographic apparatus in the form of a hand-held, self-developing camera incorporating the invention. The camera, designated 10, comprises a relatively thin, parallelepiped shaped housing including a forward wall 12, rear wall 14, side walls 16 and 18 and end walls 20 and 22. The camera housing is provided with a suitable door or movable panel 24 in rear wall 14 to permit loading of a film pack or assembly of film units into the camera housing and a forward door 26 in forward wall 12 to permit withdrawal of a film unit from the camera following exposure and processing of the film unit within the camera. Door 26 opens into a processing chamber 27 defined by an intermediate wall 29 separating the processing chamber from other portions of the interior of the camera housing.

The exposure means of the camera comprise an optical system including an objective lens 28, which may be of the conventional type including an aperture stop, mounted on forward wall 12 adjacent end wall 20. The construction and mounting of lens 28 may be conventional or provision may be made for changing the focal length, magnification, and/or direction and location of the optical axis of the lens during exposure in order to move the image produced by the lens and/or correct for distortion and other problems inherent in a scanning camera of this type. The optical system of the camera also includes reflecting means in the form of a mirror 30 mounted immediately behind lens 28 for pivotal motion about an axis perpendicular to and intersecting the optical axis of the lens and lying in a plane parallel with the plane of movement of the portion of the film being exposed. Mirror 30 is pivotable to move the image during exposure of the recording medium in order to maintain the recording medium and image formed by lens 28 substantially stationary during exposure and movement of the recording medium past the shutter aperture. This results in scanning of a narrow portion of the scene corresponding to the shutter aperture.

Figure 1:
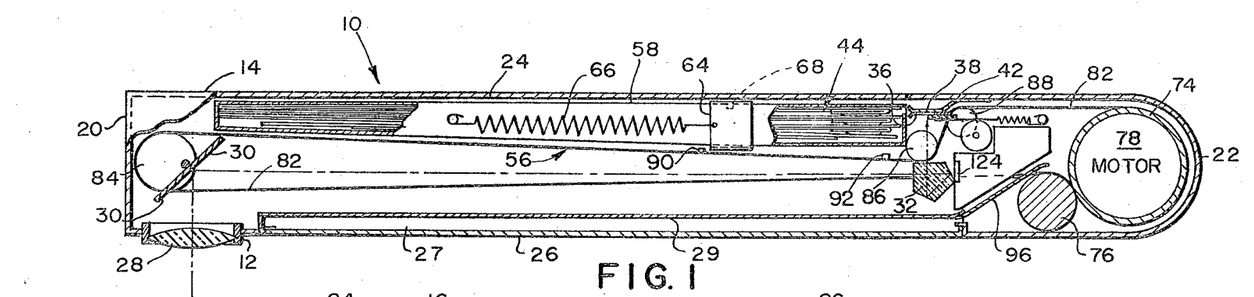
FIGURE 1 is an elevational, sectional view of a camera embodying the invention, the section being taken substantially midway between the sides of the camera.
Figure 2:
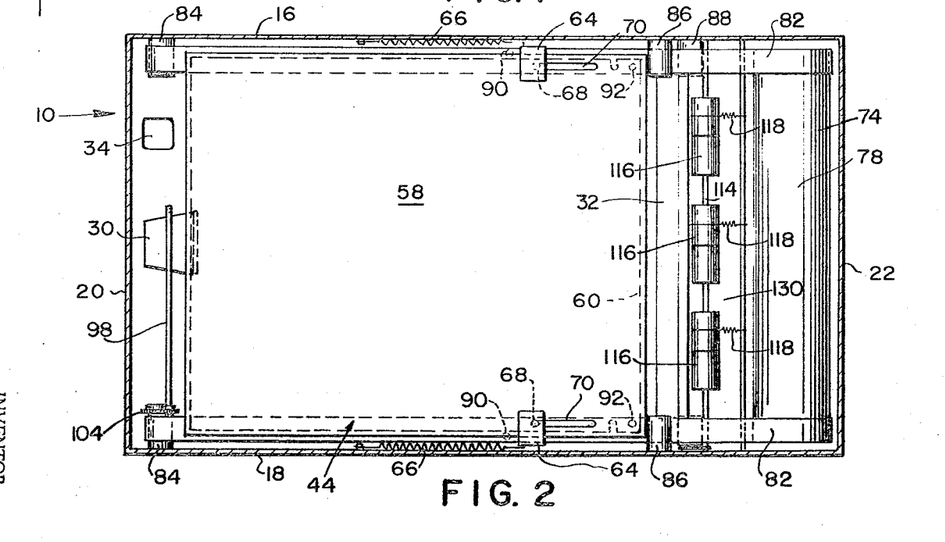
FIG. 2 is a plan view of the camera of FIGURE 1 shown with portions of the housing broken away.

In the form of camera shown in FIGURE 1, the long dimension of the optical path is parallel with the long dimension of the camera and the direction of movement of the recording medium during exposure and, due to the nature of the film system being employed, includes means providing for an odd number of reflections to produce a rectified image as well as to direct light from the lens onto the recording medium in a direction generally perpendicular thereto. These last two functions are performed by reflecting means in the form of a pentaprism 32 mounted in the path of light from mirror 30 closer to the opposite end of the camera housing for reflecting light from mirror 30 toward the rear of the camera housing. It should be apparent that the optical system including the objective lens and mirrors may be modified substantially in order to achieve a particular result, to correct for distortions or to produce a particular motion of the image, yet will still fall within the scope of the invention.

The camera also incorporates a conventional view finder 34 which may be mounted in the end of the camera housing adjacent lens 28 and mirror 30 and if desired, other features including, for example, a range finder, a photometric system for controlling the diaphragm associated with the lens and even a flash gun or other device for artificially illuminating a subject.

The optical system is designed to form an image at a plane in the camera defined by an aperture plate 36 located near the rear wall of the camera housing in alignment with pentaprism 32 and having a rear surface located substantially at the focal plane of lens 28. Aperture plate 36 is formed with a relatively narrow aperture 38 at least equal in length to the width of the area of the image-recording medium to be exposed and extending transversely of the direction of movement of the image-recording medium during exposure. The image-recording medium in the form of a sheet or assembly of sheets is moved behind aperture plate 36 across aperture 38 while being supported against the rear surface of the aperture in position for exposure by a spring biased shoe in the form of a cantilever spring 42.

Figure 5:
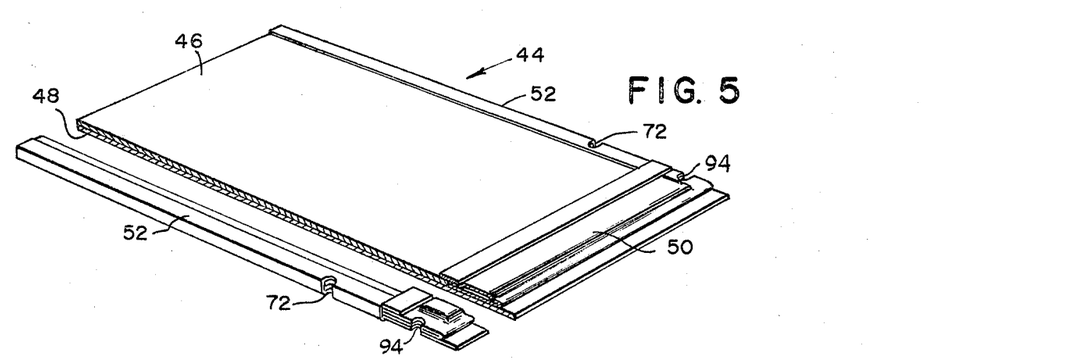
FIGURE 5 is a perspective view partially in section of a photographic film assemblage useful in the camera of the invention.

A typical film unit, designated 44, and including a light-sensitive image-recording medium is illustrated in FIG. 5 of the drawings. Film unit 44 includes a photo-sensitive image-recording sheet 46 comprising a support carrying a layer of a light-sensitive image-recording medium such as a gelatino silver halide emulsion. The film assemblage also includes the materials required to produce a positive transfer image, for example, by a process such as disclosed in United States Patent No. 2,662,822, issued December 15, 1953 to Edwin H. Land or materials for producing color prints by processes disclosed, for example, in United States Patent No. 2,983,606, issued May 9, 1963 to Howard G. Rogers and utilizing interval multilayer photosensitive sheets incorporating dye developers such as is disclosed in the copending United States application of Edwin H. Land et al., Ser. No. 565,135, filed Feb. 13, 1956, now U.S. Patent No. 3,345,163, issued Oct. 3, 1967.

In addition to photosensitive image-recording sheet 46, film unit 44 also includes a second sheet 48 and a rupturable container 50 of a viscous liquid processing reagent coupled with the photosensitive and second sheets in position to dispense its contents between the sheets when subjected to a compressive stress. The second sheet, which may function as a support for a transfer image or may merely aid in the distribution of the processing liquid in contact with the image-recording sheet and/or provide a protective covering for an image formed from the image-recording sheet, is generally rectangular in shape, slightly longer than the image-recording sheet and is substantially coextensive in width therewith. The two sheets are secured to one another at least at the lateral edges of the image-recording sheet and if desired, throughout the entire area of the image-recording sheet as shown in United States Patent No. 3,053,659, issued Sept. 11, 1962, in the name of Edwin H. Land. Container 50 of the processing liquid comprises a generally rectangular blank of a liquid- and air-impermeable sheet material folded lengthwise and secured to itself around three sides to form a cavity for the processing liquid. The longitudinal edge seal of the container is designed to rupture and provide for the unidirectional release of the liquid contents when the container is subjected to compressive pressure and the container is mounted on the extended portions of second sheet 48 with this longitudinal edge (adapted to become unsealed) closely adjacent the edge of the image-recording sheet 46. Tapes 52 are provided as a preferred means for securing sheets 46 and 48 in super-position at their lateral edges and a third tape 54 is secured so as to overlap the end of image-recording sheet 46 and the longitudinal edge of container 50 so that liquid ejected from the container will be conducted between the image-recording and second sheets. The tapes 52 in the edges of the film unit perform the additional functions of controlling the spreading of the processing liquid as a layer of the desired thickness, preventing escape of the processing liquid from between the sheets at their edges and preventing air from entering between the sheets and becoming entrained in the processing liquid as the processing liquid is distributed between the sheets.

A preferred form of film unit useful in the camera of the invention is designed to produce a full color positive image when exposed and then processed by a layer of liquid distributed in contact with the image-recording sheet. In this preferred form of film unit, second sheet 48 is transparent to permit exposure of the image-recording sheet and viewing of the transfer image through the second sheet which may remain in place in covering relation to the photosensitive sheet and transfer image following processing as well as prior to and during exposure and processing. The image-recording sheet comprises a photo-sensitive layer composed of a plurality of strata incorporating silver halides and dye developers as disclosed in the aforementioned Patent No. 3,345,163 and second sheet 48 may comprise any one of many conventional transparent film base materials such as cellulose acetate, polyethylene terephthalate, and the like. The processing liquid includes reagents adapted, when absorbed into the photosensitive layer, to form an image-wise distribution of image-forming substances constituting the visible image and transferring the image-forming substances toward the inner surface of the second sheet where they form an image, preferably in terms of dyes. For this purpose, the processing liquid and/or a layer on the inner surface of the second sheet include materials substantive to dyes for insuring formation of the dye image in a strata adjacent the second sheet. In a preferred process in which the second sheet is retained in super-position with the image-recording sheet following completion of image formation, a white-appearing pigment is provided in the processing liquid for masking the negative image in the image-recording sheet and providing a suitable background for the transfer image. Materials useful for this background masking layer include, for example, pigments such as finely divided titanium dioxide dispersed in the processing liquid which also includes a colloidal or polymeric thickening agent such as hydroxyethyl cellulose or sodium carboxymethyl cellulose.

A plurality of film units 44 are provided in a container or box 56 including a rear wall 58 and an end wall 60. Film units 44 are arranged in stacked relation within container 56 with the image-recording sheets facing away from rear wall 58 and the ends of the film units including the containers located adjacent end wall 60. A pressure plate 61 and spring (not shown) are provided in the film container for supporting the film units against rear wall 58. The end wall includes a slot 62 located at the juncture of the rear and end walls to permit movement of the film units, one at a time, from the container and suitable means may be provided in slot 62 for sealing the slot against the emission of light.

Means are provided in the camera for advancing the leading ends of the film units, one at a time, from container 56 through slot 62 and in the form shown, these means comprise a pair of L-shaped sliders 64 mounted within the camera housing preferably on the inside of door 24 for lengthwise reciprocating movement. Each of sliders 64 includes a spring 66 for biasing the slider toward end wall 20 of the camera housing and a projection 68 adapted to extend into container 56 through a slot 70 in rear wall 58 adjacent one side thereof. Projection 68 is designed to engage one of a pair of first notches 72 in the lateral edges of the rearmost film unit and advance the film unit from container 56 in response to movement of the slider in the direction of the leading end of the film unit and end wall 22 of the camera housing. Means, to be described more fully hereinafter, are provided in the camera for engaging sliders 64 and moving them against the bias of spring 66 to advance the rearmost film unit from container 56 and then become disengaged from the sliders to permit the sliders to return to their initial positions in engagement with the first notches 72 of the next succeeding film unit following withdrawal of the rearmost film unit.

Processing of an exposed film unit 44 is effected by advancing the film unit, leading end first, between a pair of juxtaposed pressure-applying members which apply compressive pressure to the film unit commencing with the container and progressing toward the opposite or trailing end of the film unit. In the form shown, the juxtaposed pressure-applying members take the form of an enlarged cylinder 74 mounted within the housing adjacent end wall 22 and a roller 76 of smaller diameter mounted in juxtaposition with cylinder 74 closely adjacent forward wall 12. The film unit is advanced, leading end first, from container 56 generally parallel with rear wall 14 between aperture plate 36 and spring shoe 42 into tangency with cylinder 74 around the cylinder between the latter and end wall 22 and thence between the cylinder and roller 76 to rupture container 50 and distribute its liquid contents between the image-recording and second sheets of the film unit.

It will be appreciated that exposure is initiated as the image-recording sheet moves past aperture 38 and may still be occurring depending upon the length of the image-recording sheet, during processing of the film unit, making it important that the speed of movement of the film unit be precisely controlled during both exposure and processing. For this purpose, cylinder 74 is driven by a motor, e.g., electrical or spring, which also functions to drive sliders 64 and operate the scanning component, i.e., pivoted mirror 30, in order to synchronize the motion of the image-recording sheets with the image motion. In the form of camera housing shown, this motor, designated 78, is mounted within cylinder 74 and in the case of an electric motor, the cylinder is coupled with or may even comprise a component of the motor armature thereby achieving a more compact construction in accordance with one of the objects of the invention. A power supply in the form of batteries for driving the electric motor may also be incorporated within cylinder 74 and thereby further contributes to the compactness of the camera structure.

Means are provided coupled with cylinder 74 for driving sliders 64 to advance a film unit from container 56 and then move the film unit around cylinder 74 between the latter and roller 76 and thence into a processing chamber 27 behind forward door 26 from whence the film unit may be withdrawn following completion of processing. These film advancement means comprise a pair of endless belts 82 extending around the ends of cylinder 74 which function as a pulley for advancing the belts and thence between cylinder 74 and roller 76 toward the opposite end of the camera housing around pulleys 84 located near end wall 20 and thence back upon themselves adjacent the forward wall of film container 56 to a pair of pulleys 86 located adjacent pentaprism 32 and then forwardly to a third pair of pulleys 88 located near rear wall 14 and the side of aperture plate 36 furthest from the film container. Each of belts 82 includes first and second projections 90 and 92 spaced a predetermined distance apart on each belt and aligned with the corresponding engagement members on the other belt. The paths of belts 82 lie closely adjacent portions of sliders 64 so that the first projections engage sliders 64 to move the sliders in engagement with a film unit toward the leading end of the film unit to advance the film unit from the film pack container across aperture plate 36 between the latter and spring shoe 42 until the leading end portion of the film unit is located adjacent pulleys 88 between the latter and the rear wall of the camera housing. Each film unit 44 is provided with a second pair of notches 94 in the lateral edges of the leading end portion thereof and second projections 92 on the belts are positioned to become engaged in second notches 94 during movement of the film unit from the film pack container as the second notches and second projections move into alignment at pulleys 88. By virtue of this construction, movement of each film unit is continuous and at a speed determined by the speed of rotation of cylinder 74 thereby insuring continuous uninterrupted movement of the image-recording sheet during exposure. The paths of movement of sliders 64 and first projections 90 on belts 83 diverge in the vicinity of pulleys 86 so that the first projections become disengaged from the sliders after the second projections have engaged the film unit thereby allowing the sliders to return under the bias of springs 66 to their initial positions in readiness to advance the next succeeding film unit. Second projections 92 are positioned inwardly with respect to the sides of the housing from first projections 90 so as not to engage and move sliders 64 whereas the first projections engage the sliders and are positioned outwardly of the edges of the film units so as not to interfere with advancement of the film units.

As a film unit is advanced between cylinder 74 and roller 76, belts 82 redirect its path of movement in a direction behind wall 29 of chamber 27, and a guide member 96 is provided in the path of movement of the film between belts for guiding the film unit along a path diverging from the path of movement of the belts into processing chamber 27.

Mirror 30, as previously noted, is also driven by motor 78. For this purpose, mirror 30 is mounted on a shaft 98 and is pivoted by a cam follower 100 secured to the shaft and engaged with a cam 102 rotated by a transmission including a gear 104 and a pinion 106 coupled with one of pulleys 84. Cam 102 is designed to pivot mirror 30 through the desired number of degrees of rotation during exposure of a film unit effected by movement of the film unit across shutter aperture 38 and return the mirror to its initial position during the remaining portion of the cycle of the apparatus. Synchronism between the image motion and film movement is assured because motion of both the mirror and film is effected by the same belts.

Figure 3:
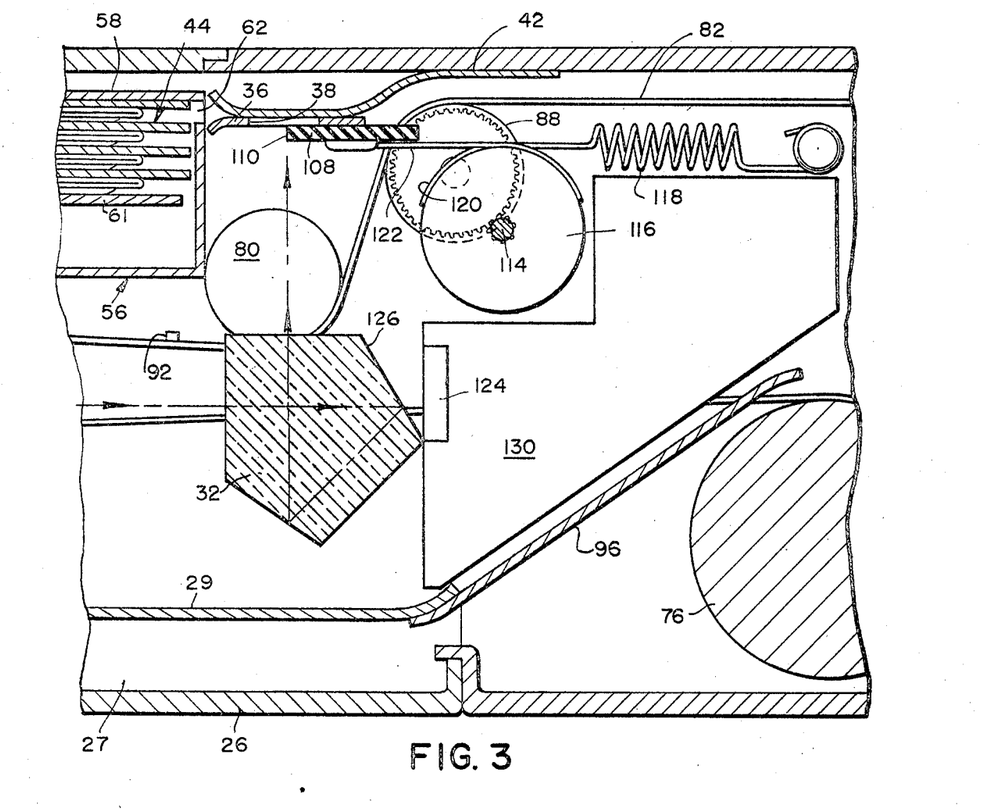
FIG. 3 is a detailed view of a portion of the camera of FIGURE 1 shown greatly enlarged.
Figure 4:
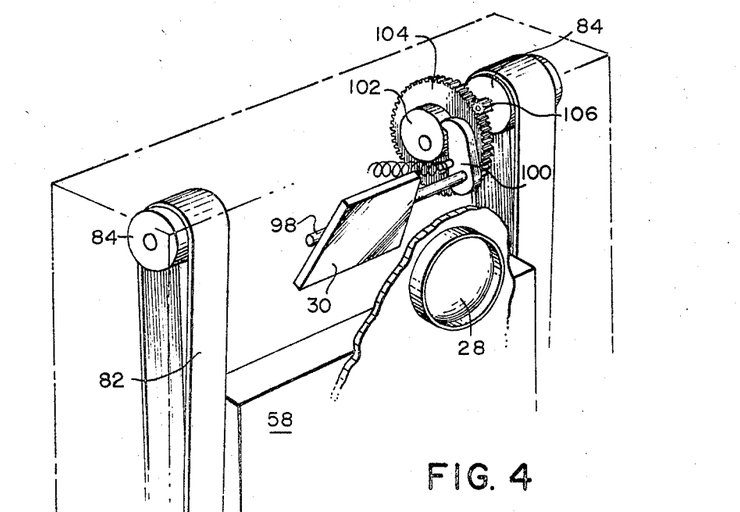
FIG. 4 is a phantom, perspective view of the camera of FIGURE 1.
Figure 6:
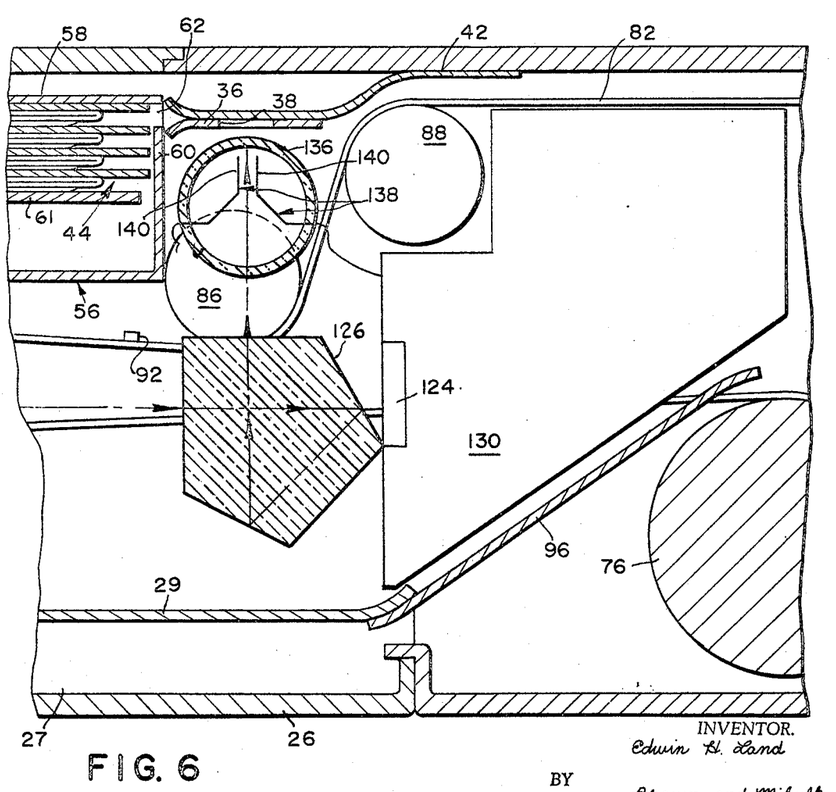
FIG. 6 is a view similar to FIG. 3 illustrating another embodiment of the invention.

Means for varying the light transmittance of the aperture 38, specifically, by varying the width of the aperture in accordance (inverse proportion) with the brightness of the light falling on the aperture are shown in detail in FIGS. 3 and 6. These means comprise an electromechanical transducer associated with aperture plate 36 for varying the width of the aperture and a sensing and control circuit responsive to light for operating the transducer. As previously noted, light transmittance, e.g., width, of aperture 38 may be varied uniformly throughout its length or in a preferred form of the invention, the aperture is divided into zones and the light transmittance of each zone is varied in accordance with the intensity of light falling on that particular zone. This latter construction may be preferred over varying the light transmittance uniformly throughout the entire aperture because it results, in effect, in a two-dimensional compression of the brightness scale of the scene whereas uniform control over aperture light transmittance results in compression of the scene brightness scale primarily in the direction of the movement of the film, i.e., transversely of the aperture length. However, it should be noted that insofar as the photoresponsive control system senses and integrates the light intensities falling on the entire aperture and controls the aperture width in accordance with the average intensity of light throughout the length of the aperture, there is a two-dimensional compression of the scene brightness. It may be desirable, for example, to construct the camera to scan scenes in a horizontal direction from side to side with the resultant likelihood that in many scenes, the sky will appear as a relatively bright subject in the upper part of the scene and subjects in the foreground will appear as substantially less bright subjects in the lower portion of the scene. In such an instance, the direction in which the brightness scale of the scene should be compressed is perpendicular to the direction of film motion and varying aperture light transmittance uniformly throughout the aperture length will be substantially less effective to compress scene brightness scale than varying the light transmittance in a plurality of zones of the aperture whereby it is possible to reduce the light transmittance of the portion of the aperture through which the brighter (sky) portion of the scene is recorded and increase the light transmittance of the zone of the aperture through which the less bright portions of the scene are recorded.

It should also be apparent that increasing the number of individually controllable zones into which the aperture is divided will make possible an increase in the extent to which the brightness scale of the scene can be compressed. However, varying the light transmittance from zone to zone of the aperture raises another problem, specifically, making the transitions between zones of differing transmittance so gradual that the difference does not appear visible to the observer of the photograph. Abrupt changes in light transmittance will result in the appearance of parallel bands or stripes of different overall density extending in the direction of film motion and apparent to the observer whereas gradual transitions may result in measurable differences in density between parallel zones of the visible image, but these differences will not be noticed by the observer and the image will appear as a high-quality image containing more information than one in which the brightness scale of the subject was not compressed. In the case of an aperture, the width of which is varied from zone to zone, the slope of the edge of the aperture between zones represents the controlling gradient just as does the slope of a curve representing the density versus length dimension of a variable density window, proposed as an alternative means for controlling the light transmittance of the shutter aperture.

The maximum slope of the light transmittance gradient is best determined empirically since it is dependent upon a number of subjective factors including the nature of the photographic medium, i.e., color or black-and-white, the composition of the scene, the extent of brightness scale of the scene, the criticality of the viewer, the nature of the finished photograph and the manner in which it is viewed. Another factor related to the slope of the transition gradient is the number and width of the aperture zones. Obviously for a given percentage change in light transmittance, i.e., ratio of change in light transmittance to maximum light transmittance by an aperture of given length and width, an increase in the number of zones will result in an increase in the slope of the transmittance gradient. Thus, the maximum gradient (G) determined empirically may be expressed as a function of the percentage maximum variation possible (R) and the number (N) of zones into which the aperture is divided, as follows:

$$G = f(R)(N)$$

wherein $N > 1$. It should be apparent from the foregoing that the design of a particular aperture, specifically the percentage variation in aperture light transmittance and the number of zones, will represent a compromise between obtaining the largest scene brightness scale compression capability, i.e., largest percentage light transmittance variance, in order to record more information that would otherwise lie without the exposure range of the image-recording medium; and providing for compressing the scene brightness scale in the maximum number of regions of the scene in order to produce a photograph containing information about a greater number of regions of the scene than would otherwise be possible.

The forms of aperture light transmittance control means shown in FIGS. 1 through 4 comprise a flexible elastic curtain 108 mounted on aperture plate 36 at least adjacent the ends of the curtain with a longitudinal portion of the curtain including a straight edge 110 extending at least partially across the aperture in closing relation thereto. Curtain 108 is adapted to be deformed to move the location of edge 110 and thereby vary the width of the shutter aperture. In the form shown, means are provided for deforming curtain 108 in three zones and comprise means coupled with the curtain at three spaced locations thereon for stretching the curtain from the undeformed position shown in FIG. 3 in which the aperture is narrowest and edge 110 is substantially parallel with and spaced a predetermined distance from the opposite edge of aperture 38. These means include a continuously rotating shaft 114 and three magnetic couplings 116 mounted coaxially with shaft 114 for rotation by the shaft when the couplings are energized. The magnetic couplings are of the type energized by electric current and capable of transmitting a torque portional to the level of the energizing current. The curtain is normally deformed substantially uniformly throughout its length by three springs 118 connected to the three zones of the curtain so that the aperture is of substantially uniform width throughout its length and variations in the aperture width in each zone are achieved by selectively energizing the three magnetic couplings to apply tension to the springs and thereby permit the curtain to return to its undeformed condition so that edge 110 of the curtain moves toward the opposite edge of the aperture allowing the aperture to close. The couplings between springs 118, magnetic couplings 116 and curtain 108 including flexible connecting elements in the form of threads or tapes 120 each extending from one of springs 118 around a portion of the periphery of a coupling 116 and attached thereto and threads or tapes 122 each attached at one end to the periphery of magnetic coupling 116 and extending around the periphery in the opposite direction from thread 120 and coupled at its other end to the midportion of one of the zones of curtain 108. During an exposure, shaft 114 is rotated continuously in a direction (counterclockwise viewing FIG. 3) designed to apply tension to springs 118 and permit the curtain to close the aperture. Magnetic couplings 116 are energized so that the width of the aperture is dependent upon the level of the energizing current and will be at a maximum when the couplings are not energized.

The structure shown constitutes an electromechanical system providing for accurate control over the aperture width in a plurality of zones characterized by an extremely short response time providing for continuous and substantially instantaneous control over the width of the zones of the aperture. Curtain 108 is mounted at its ends across the aperture in a stretched condition so that deformation of the curtain in one zone will result in curvature of edge 110 along a gradient between the deformed zone and an adjacent zone or zones, rather than abrupt changes in aperture width from zone to zone of the aperture.

Figure 7:
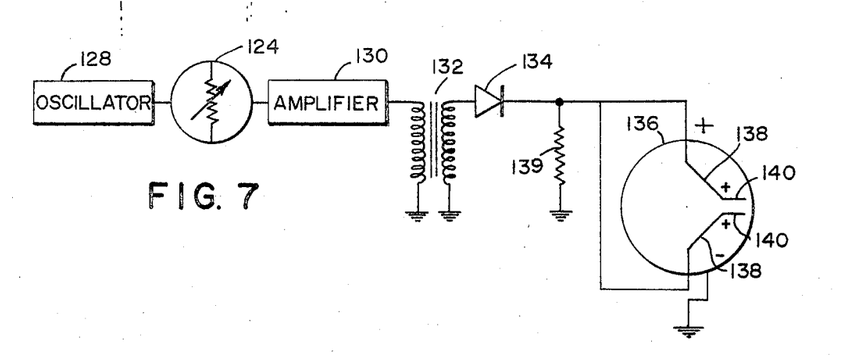
FIG. 7 is an electrical diagram of a circuit component of the camera.

Photoresponsive means for controlling and varying the width of the aperture are illustrated in FIG. 7 and include three light-dependent resistors 124 mounted adjacent a reflecting surface 126 of pentaprism 32 in locations corresponding to the zones of the apertures which they are designed to control. The reflecting surface 126 of the pentaprism is partially light transmitting, e.g., partially silvered, so as to transmit light to the light-dependent resistors and, because of the proximity of the pentaprism to the shutter aperture, each resistor effectively senses the brightness of the light falling upon the zone of the aperture which the resistor controls. A separate control circuit is provided for each zone of the aperture and includes, in addition to the light-dependent resistor 124, a power supply such as a battery (which may be the same battery employed to power motor 78) and an oscillator 128 and means for energizing a magnetic coupling including, in series, an amplifier 130 for amplifying the signal from the light-dependent resistor, a transformer 132 and a rectifier 134. According to this arrangement, the resistance of resistor 124 is inversely portional to the light falling on the resistor so that an increase in the intensity of the light illuminating the resistor will result in the flow of greater current to the magnetic coupling controlled by the resistor causing the particular zone of the aperture to be narrowed and transmit less light.

The light-dependent resistor and amplifier combination is adjusted to provide a nominal current flow to the magnetic coupling when the intensity of the light falling on the resistor is approximately midway in the range of light intensities for which the aperture is designed for use so that when the intensity of the light falling on the light-dependent resistor drops below this intermediate level, the current supplied to the magnetic coupling will also be reduced thereby increasing the width of the exposure aperture to permit more light to be transmitted to the image-recording medium.

The electro-mechanical aperture width control device and the photoresponsive controls therefor may be modified, for example, by utilizing the elasticity of the curtain to close the aperture and employing the magnetic couplings to open the aperture. The construction of this embodiment will be basically the same as that described except that springs 118 will be eliminated, shaft 114 will be rotated in the opposite direction, and light-dependent resistor 124 will be of the type having a resistance inversely portional to the brightness of the light incident thereon.

The invention comprehends other forms of means for controlling the light transmittance, e.g., width of transmission density, of the shutter aperture. Another device of this type, shown in FIGS. 6 and 7, operates electrostatically and comprises an elongated tube 136 providing an atmosphere of predetermined composition and pressure formed of a light transmitting material, e.g., glass, with a uniform wall thickness at least in regions through which light passes so as not to have any lens power. Tube 136 is mounted in front of aperture 38 adjacent the aperture plate between the latter and pentaprism 32. Mounted within the tube are a pair of elongated, light-opaque, membranes 138 formed of a resilient conductive material such as gold leaf and having a generally U- or V-shaped cross section, with longitudinal portions 140 located in juxtaposed spaced relation so as to define therebetween an elongated aperture slit. Membranes 138 are resiliently biased toward one another and a circuit is provided for producing electrostatic charges of the same size on portions 140 so that the spacing between portions 140 of the membranes defining the width of the aperture is dependent upon the potential or electron population of the charges on the membranes. The charge generating and control circuit for this form of variable width aperture is essentially the same as that shown in FIG. 6 except that the light-dependent resistor is of the type exhibiting resistance inversely portional to the intensity of light faling thereon. The membranes are coupled with the rectifier and a reference potential is provided by grounded, slightly conductive atmosphere in the tube. A bleeder circuit including a resistance 139 is provided between the rectifier and the membranes for bleeding off the charge on the membranes to close the aperture when the output to the amplifier and rectifier are reduced below a previous value. The time constant of the bleeder and capacitor (membranes) circuit thus formed is preferably selected to provide a very short response time for the variable width aperture. Membranes 138 may also be divided into zones electrically insulated from one another so that the potential across each zone may be controlled independently of the potential across the other zones and in this way, the membranes may be energized to vary the width of the aperture differentially throughout its length. The zones of the membranes, although electrically separated, will be physically joined to insure a gradual transition in width from one aperture zone to an adjacent zone of different width and in an alternative embodiment, may comprise electrically conductive coatings on dielectric films.

Another method of varying the transmittance of an aperture is to provide a window through which the light is transmitted and vary the transmission density of the window. Transmission density of a window may be changed mechanically, electrically, optically or in a combination of ways with the principal requirements being that the response is very fast and the transmission density be, in effect, continuously variable. The window may comprise one or a plurality of windows in side-by-side and/or overlying relation and constructions include photographic materials including both liquids and solids having light-transmission properties which vary in response to exposure to light, mechanical stress or the application of electrical or magnetic fields. The shutter aperture itself may comprise a window or filter in which is dispersed a material exhibiting reversible phototropic (e.g., photochromic) properties so that the aperture itself functions as a variable light transmissive filter capable of reducing the dynamic range of the intensity of light reaching the film without the necessity for a separate photoresponsive control system.

Other forms of windows having a transmission density subject to variation either electrically or electromechanically and considered to fall within the scope of the invention include windows comprising crystals or dipole particles having transmission densities dependent upon the orientation of the crystals or dipoles which may be varied electrically or electrostatically. Such windows may comprise light polarizers having variable polarization axes. Another form of mechanically variable windows may comprise two or more light transmitting elements such as polarizers combined to have a transmission density dependent upon the relative orientation of the two elements. Such elements may be designed to provide for varying the light transmission density throughout the full range in response to a very small relative motion of the two elements, e.g., motions of the order of a few thousandths of an inch. Such a window lends itself to variation in light transmission by electrically operated transducers such as piezoelectric or magnetostrictive crystals controlled by a circuit similar to that described.

What is claimed is:

1. For use in photographic apparatus including optical means for forming an image at a surface, an exposure control system comprising, in combination:
    means defining an aperture located near said surface in substantially fixed relation to said optical means and said surface, said aperture having one dimension substantially less than the corresponding dimension of said image formed by said optical means;
    means for locating at least a portion of a light-sensitive image-recording medium at said surface in position for exposure to light transmitted by said aperture;
    means for moving said medium and said image relative to said aperture in the direction of said one dimension and retaining said image and said medium substantially stationary with respect to one another to record said image in said medium; and
    photoresponsive means associated with said aperture for sensing the intensity of light falling on said aperture and during exposure of said medium, changing a parameter of said aperture as a function of said intensity to vary the light energy transmitted by said aperture.

2. For use in photographic apparatus including optical means for forming an image at a surface, an exposure control system comprising, in combination:
    means defining a relatively narrow, elongated aperture located at least closely adjacent said surface in substantially fixed relation to said optical means and said surface;
    means for locating at least a portion of a light-sensitive image-recording medium at said surface in position for exposure to light transmitted by said aperture;
    means for moving said medium and said image relative to said aperture in a direction transverse to the length of said aperture and retaining said image and said medium substantially stationary with respect to one another to record said image in said medium; and
    photoresponsive means associated with said aperture for sensing the intensity of light falling on said aperture and during exposure of said medium, changing a parameter of said aperture as a function of said intensity to vary the light energy transmitted by said aperture.

3. An exposure control system as defined in claim 2 wherein said photoresponsive means include means for varying the width of said aperture in inverse proportion to said light intensity.

4. For use in photographic apparatus including optical means for forming an image at a surface, an exposure control system comprising, in combination:
means defining a relatively narrow, elongated aperture located at least closely adjacent said surface;
means for locating at least a portion of a light-sensitive image-recording medium at said surface in position for exposure to light transmitted by said aperture;
means for effecting relative motion of said medium and said aperture in a direction transverse to the length of said aperture and retaining said image and said medium substantially stationary with respect to one another to record said image in said medium; and
photoresponsive means associated with said aperture for sensing the intensity of light falling on said aperture and during exposure of said medium, changing a parameter of said aperture as a function of said intensity to vary the light energy transmitted by said aperture to reduce fluctuations in the light energy incident on incremental areas of said recording medium.

5. For use in photographic apparatus including optical means for forming an image at a surface, an exposure control system comprising, in combination:
means including a light-transmitting element defining a relatively narrow, elongated aperture;
means for locating at least a portion of a light-sensitive image-recording medium at said surface in position for exposure to light transmitted by said aperture;
means for effecting relative motion of said medium and said aperture in a direction transverse to the length of said aperture and retaining said image and said medium substantially stationary with respect to one another to record said image in said medium; and
photoresponsive means associated with said aperture for sensing the intensity of light falling on said aperture and during exposure of said medium, varying the transmittance of said light-transmitting element in inverse proportion to said light intensity.

6. For use in photographic apparatus including optical means for forming an image at a surface, an exposure control system comprising, in combination:
means defining a relatively narrow, elongated aperture located at least closely adjacent said surface and including a plurality of contiguous zones arranged lengthwise of said aperture;
means for locating at least a portion of a light-sensitive image-recording medium at said surface in position for exposure to light transmitted by said aperture;
means for effecting relative motion of said medium and said aperture in a direction transverse to the length of said aperture and retaining said image and said medium substantially stationary with respect to one another to record said image in said medium; and
photoresponsive means associated with said aperture for sensing the intensity of light falling upon each of said zones of said aperture and during exposure of said medium, varying a parameter of said each zone as a function of said intensity to vary the light energy transmitted by said aperture.

7. An exposure control system as defined in claim 6 wherein said photoresponsive means include means for varying the widths of said zones of said aperture independently of one another in inverse proportion to the intensity of light falling on said each zone.

8. A camera as defined in claim 7 wherein said means for varying the widths of said zones of said aperture include means providing gradual variations in aperture width from zone to zone.

9. An exposure control system as defined in claim 6 wherein said means defining said aperture include a plurality of light-transmitting elements each constituting one of said zones and said photoresponsive means include means for varying the transmittance of each of said elements in inverse proportion to the intensity of light falling thereon.

10. In photographic apparatus including means for forming an image at an aperture, means for moving said image relative to said aperture, means for locating a light-sensitive image-recording medium at said aperture in position for exposure to light transmitted by said aperture, and means for effecting the relative movement of said image-recording medium and said aperture in a direction transverse the the length of said aperture to expose said medium while maintaining said medium and said image substantially stationary with respect to one another, the combination comprising:
means defining a relatively narrow elongated aperture for transmitting light to a light-sensitive image-recording medium moved relative to and past said aperture in a direction transverse to the length of said aperture; and
photoresponsive means associated with said aperture for sensing the intensity of light falling on said aperture and, during exposure of said medium, varying a parameter of said aperture as a function of said intensity to minimize fluctuation in light energy incident on incremental areas of said recording medium.

11. In a camera including an optical system for forming an image at a surface, the combination comprising:
means defining a relatively narrow, elongated aperture located at least closely adjacent said surface in substantially fixed relation to said optical system and said surface;
means for locating at least a portion of a light-sensitive image-recording medium at said surface in position for exposure to light transmitted by said aperture;
means for moving said image at said surface relative to said aperture in a direction transverse to the length of said aperture;
means for moving said medium at a predetermined speed relative to and past said aperture to retain said image and said medium substantially stationary with respect to one another to record said image in said medium; and
photoresponsive means associated with said aperture for sensing the intensity of light falling on said aperture and during exposure of said medium, changing a parameter of said aperture as a function of said intensity to vary the light energy transmitted by said aperture.

12. A camera as defined in claim 11 wherein said photoresponsive means include means for varying the width of said aperture in inverse proportion to said light intensity.

13. In a camera including an optical system for forming an image at a surface, the combination comprising:
means defining a relatively narrow, elongated aperture located at least closely adjacent said surface;
means for locating at least a portion of a light-sensitive image-recording medium at said surface in position for exposure to light transmitted by said aperture;
means for moving said image at said surface relative to said aperture in a direction transverse to the length of said aperture;
means for moving said medium at a predetermined speed relative to and past said aperture to retain said image and said medium substantially stationary with respect to one another to record said image in said medium; and
photoresponsive means associated with said aperture for sensing the intensity of light falling on said aperture and during exposure of said medium, changing a parameter of said aperture as a function of said intensity to vary the light energy transmitted by said aperture to reduce fluctuations in the light energy incident on incremental areas of said recording medium.

14. In a camera including an optical system for forming an image at a surface, the combination comprising:
a light-transmitting element;
means defining a relatively narrow, elongated aperture located at least closely adjacent said surface;
means for locating at least a portion of a light-sensitive image-recording medium at said surface in position for exposure to light transmitted by said aperture;
means for moving said image at said surface relative to said aperture in a direction transverse to the length of said aperture;
means for moving said medium at a predetermined speed relative to and past said aperture to retain said image and said medium substantially stationary with respect to one another to record said image in said medium; and
photoresponsive means associated with said aperture for sensing the intensity of light falling on said aperture and during exposure of said medium, varying the intermittence of said light-transmitting element in inverse proportion to said light intensity.

15. In a camera including an optical system for forming an image at a surface, the combination comprising:
means defining a relatively narrow, elongated aperture located at least closely adjacent said surface and including a plurality of contiguous zones arranged lengthwise of said aperture;
means for locating at least a portion of a light-sensitive image-recording medium at said surface in position for exposure to light transmitted by said aperture;
means for moving said image at said surface relative to said aperture in a direction transverse to the length of said aperture;
means for moving said medium at a predetermined speed relative to and past said aperture to retain said image and said medium substantially stationary with respect to one another to record said image in said medium; and
photoresponsive means associated with said aperture for sensing the intensity of light falling upon each of said zones of said aperture and during exposure of said medium, varying a parameter of said each zone as a function of said intensity to vary the light energy transmitted by said aperture.

16. A camera as defined in claim 15 wherein said photoresponsive means include means for varying the widths of said zones of said aperture independently of one another in inverse proportion to the intensity of light falling on said each zone.

17. A camera as defined in claim 16 wherein said means for varying the widths of said zones of said aperture include means providing gradual variations in aperture width from zone to zone.

18. A camera as defined in claim 15 wherein said means defining said aperture include a plurality of light-transmitting elements each constituting one of said zones and said photoresponsive means include means for varying the transmittance of each of said elements in inverse proportion to the intensity of light falling thereon.

References Cited
UNITED STATES PATENTS

| 2,307,646 | 1/1943 | Sonne | 95—64 XR |
| 2,599,517 | 6/1952 | Raspet | 95—12.5 |
| 3,116,670 | 1/1964 | Ball | 95—10 |
| 3,324,777 | 6/1967 | Kanner | 95—12.5 XR |

NORTON ANSHER, Primary Examiner

J. F. PETERS, Jr., Assistant Examiner

U.S. Cl. X.R.

95—15, 53, 64